June 9, 1953 W. L. SHEPPARD 2,640,999
PORTABLE BED AND HOUSING STRUCTURE
Filed Aug. 24, 1949 4 Sheets-Sheet 2
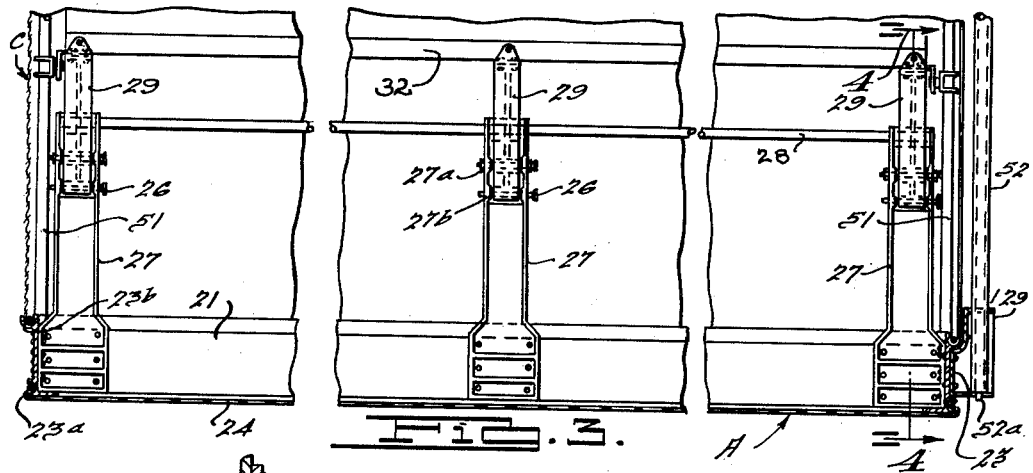
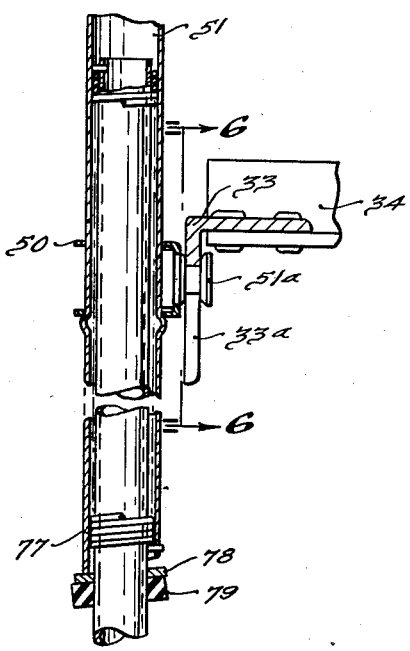
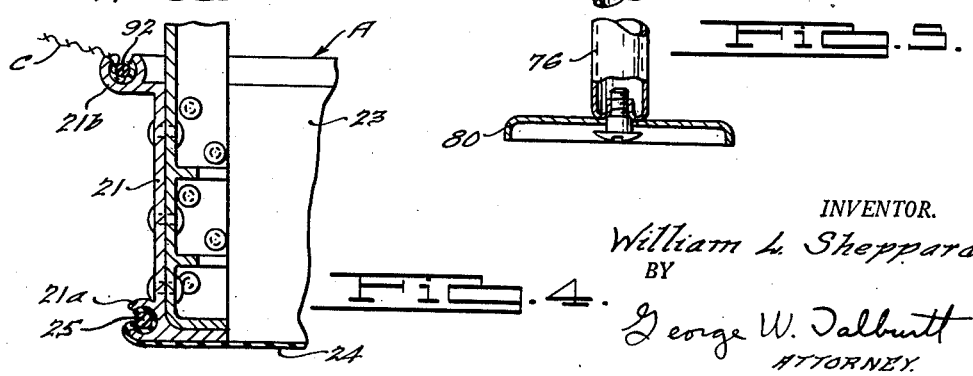
INVENTOR.
William L. Sheppard.
BY
George W. Talbutt
ATTORNEY.

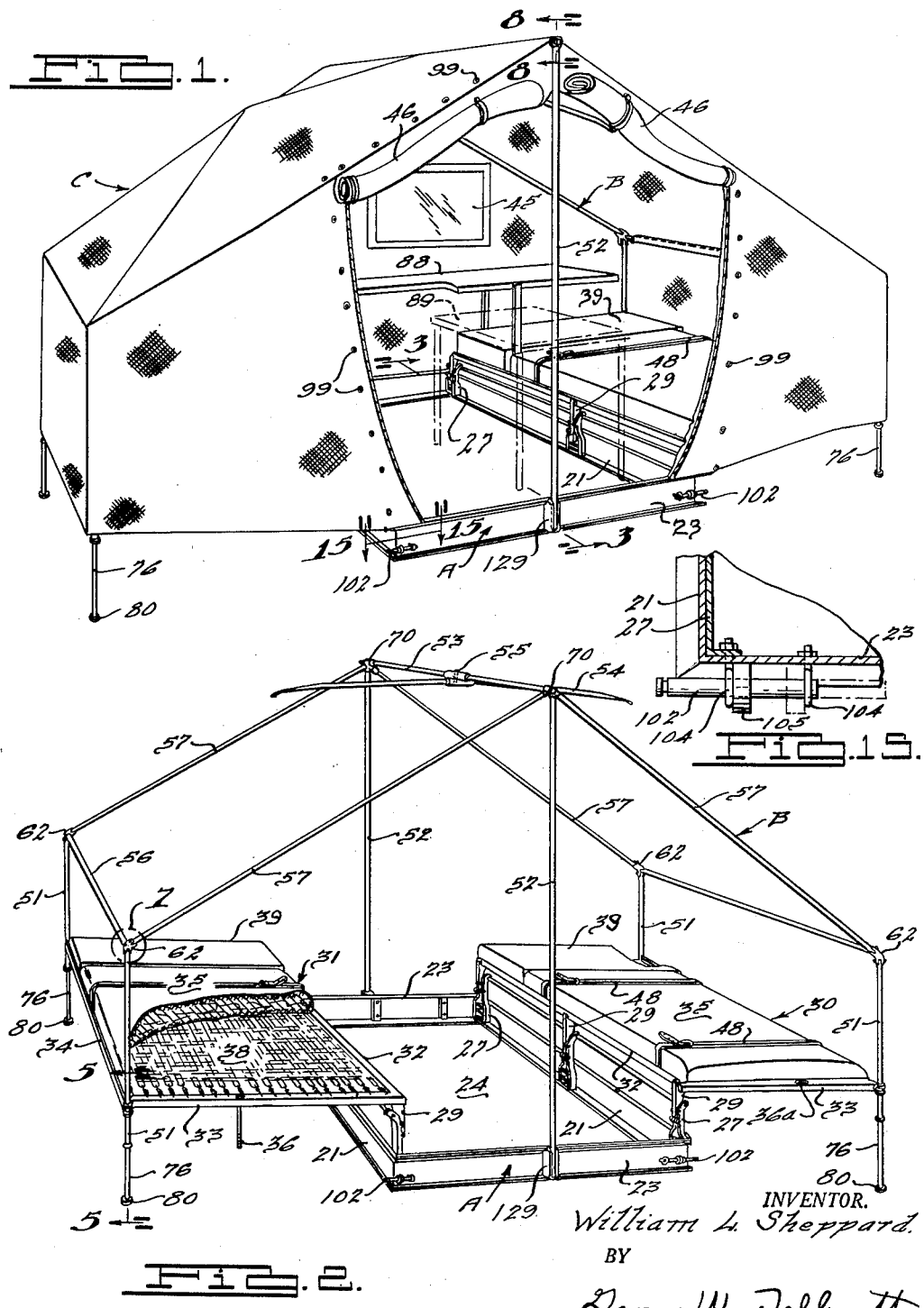

June 9, 1953 W. L. SHEPPARD 2,640,999
PORTABLE BED AND HOUSING STRUCTURE
Filed Aug. 24, 1949 4 Sheets-Sheet 3
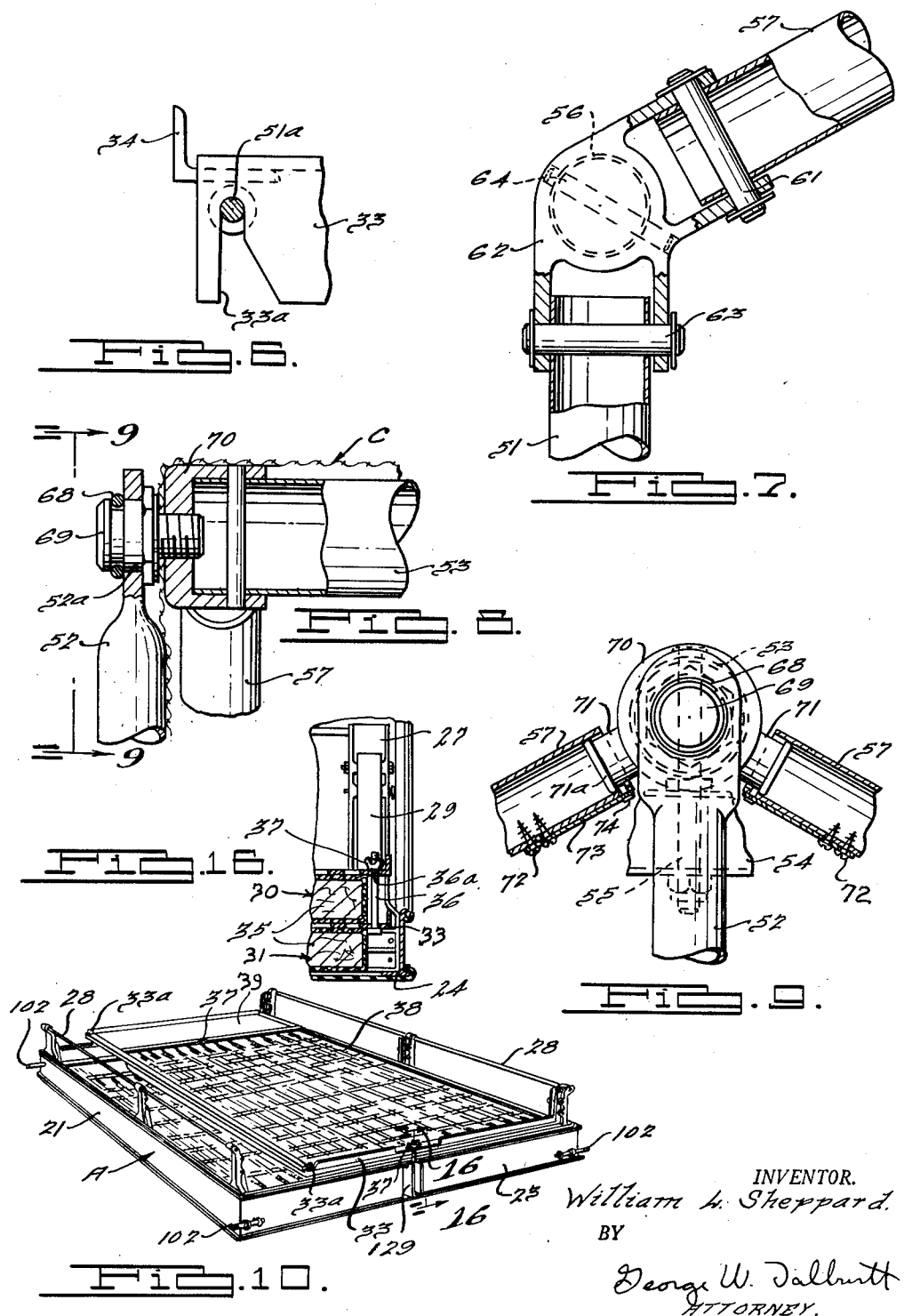
INVENTOR.
William L. Sheppard
BY
George W. Talbutt
ATTORNEY.

June 9, 1953            W. L. SHEPPARD            2,640,999

PORTABLE BED AND HOUSING STRUCTURE

Filed Aug. 24, 1949                                    4 Sheets-Sheet 4

INVENTOR.
William L. Sheppard.
BY
George W. Dalbruth
ATTORNEY.

Patented June 9, 1953

2,640,999

UNITED STATES PATENT OFFICE 2,640,999

PORTABLE BED AND HOUSING STRUCTURE

William L. Sheppard, Romulus, Mich.

Application August 24, 1949, Serial No. 112,165

12 Claims. (Cl. 5—113)

This invention relates to portable, knock-down, housing structures of the type particularly adapted for use by outdoor campers such as hunters, fishermen and vacation tourists.

It is a primary object of this invention to provide a knock-down housing structure which may be readily transported on the roof of a conventional motor vehicle or the like without requiring the use of any sort of house carrier racks, cradles or other auxiliary supporting framework.

It is an additional object of this invention to provide a knock-down, portable, housing structure which when erected provides maximum living space and comfort while requiring a minimum of space for the house foundation supporting area.

It is a further object of this invention to provide a knock-down, portable, housing structure which includes permanently associated, folding bed units that also provide resilient supporting means for the housing structure and its contained load when the housing structure is in its collapsed, transportable condition.

It is another object of this invention to provide a knock-down, portable housing structure which includes permanently associated, folding bed units that serve a plurality of functions in addition to their normal function of providing sleeping areas when in erected positions.

It is still another object of this invention to provide novel means for elevating and mounting the knocked-down, portable housing structure on the roof of a conventional motor vehicle or the like.

It is a further object of this invention to provide a portable, knock-down, housing structure that includes a box-like foundation member adapted to serve as a carrier case for the collapsible housing structure as well as a container for other articles or supplies needed by the house occupants. To permit the use of the housing unit as a supply carrier when it is collapsed, the box-like foundation member of the housing unit is formed so that it may be mounted on its transporting vehicle in a partially packed condition after which it may be completely filled with various types of camping equipment and supplies that may be needed by the house occupants. After being completely filled the container unit may be covered and anchored in its transportable position on its carrier.

It is another object of this invention to provide an improved manner of mounting a pair of folding bed units in a box-like transporting container.

It is a still further object of this invention to provide an improved type of collapsible canopy supporting framework for the walls of a collapsible housing structure.

It is still another object of this invention to provide a portable, collapsible housing structure that is characterized by minimum weight with maximum size and living comfort as well as ease in the method of erection and disassembly of the unit.

Other objects and advantages of this invention will become readily apparent from a reading of the attached specification and a consideration of the related drawings wherein:

Fig. 1 is a perspective view of the housing structure in erected position with the front door flaps raised to give a view of the interior arrangement;

Fig. 2 is a view similar to Fig. 1 but showing the structure with the flexible wall covering material omitted;

Fig. 3 is an enlarged, fragmentary, sectional elevational view taken along the line 3—3 of Fig. 1, certain portions of the view being broken away for the sake of space conservation;

Fig. 4 is an enlarged sectional elevational view taken along the line 4—4 of Fig. 3 so as to clearly disclose the hinge mountings for one of the bed units;

Fig. 5 is an enlarged sectional elevational view taken along the line 5—5 of Fig. 2, the view clearly disclosing the structure for anchoring the outboard edge of one of the bed units to one of the side posts for the canopy supporting framework;

Fig. 6 is a fragmentary sectional elevational view taken along the line 6—6 of Fig. 5 showing one of the slotted anchor connections on the outboard side of the bed unit frame that is adapted to be connected to a pin carried by one of the posts of the canopy supporting framework;

Fig. 7 is an enlarged, fragmentary, sectional elevational view of the joint at the upper end of one of the side posts of the wall supporting framework, the joint being denoted by the numeral 7 in Fig. 2 of the drawings;

Fig. 8 is an enlarged fragmentary sectional elevational view taken along the line 8—8 of Fig. 1 showing the rod joint between the end of the canopy supporting ridge pole and the ridge pole supporting post;

Fig. 9 is a fragmentary side elevational view partly in section taken along the line 9—9 of Fig. 8;

Fig. 10 is a perspective view of the box-like foundation unit of the housing structure, the unit being shown with the canopy and its supporting framework removed and the bed units folded to their knocked-down positions;

Fig. 15 is an enlarged sectional, elevational view of one of the adjustable wheel supporting axles that are mounted on each end of each end wall of the box-like foundation member; and Fig. 16 is an enlarged fragmentary sectional elevational view taken along the lines 16—16 of Fig. 10 disclosing the arrangement of the bed units within the foundation unit when the bed units are collapsed.

Figure 14:
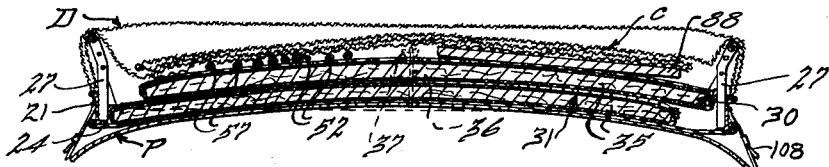
Fig. 14 is an enlarged sectional elevational view taken along the line 14—14 of Fig. 13.

This knock-down, portable housing structure comprises the box-like, foundation or container member A, the detachable canopy supporting framework B, and the flexible, weather resistant, tent-like canopy C.

The box-like foundation member A is formed from pairs of connected, spaced apart, rigid, side and end walls, 21 and 23 respectively, which walls are preferably formed from aluminum castings or extrusions so as to provide maximum strength with minimum weight. Connected across the area between the lower edges of the side and end walls 21, 23 of the box-like member A is a sheet of resilient, weatherproofed, wear resistant material 24. This material may be a rubberized fabric, nylon, a plastic or some similar material. The edges of this sheet of material 24 are anchored in the outwardly projecting, C-shaped grooves 21a, 23a that extend along the lower edges of the walls 21, 23 respectively of the container A (see Figs. 3 and 4). A resilient locking rod 25 wedgingly maintains the edges of the sheet 24 in the grooves 21a and 23a. The sheet 24 is formed of a material having such resiliency that it may readily conform to the contour of the surface on which the box-like foundation member A is supported. The reason for using a resilient bottom on the box-like container A will become more readily apparent after a reading of the subsequent description of this invention.

Each of the side walls 21 of the foundation member A have fixedly connected thereto a plurality of vertically extending hinge supports 27 (see Fig. 4). Rods 28 connect the upper ends of the supports 27 along each side of the container A. These supports 27 each include a pair of spaced apart, horizontally extending pivot pin openings 27a and 27b respectively. The supports 27 are adapted to have pivotally connected thereto the hinge arms 29 which are carried by the inboard side rails 32 of the bed units 30, 31. The hinge arms 29 each have a pair of spaced, horizontally extending pivot pin holes 29a, 29b which are adapted to be aligned with holes 27a, 27b. To provide for a stepped, overlapping relationship between the bed units when they are folded to collapsed position, the hinge arms 29 of the bed unit 30 along the right side of the member A are pivotally connected to the supports 27 by a hinge pin located in the upper set of aligned pin holes 27a, 29a. The bed unit 31 on the opposite side edge of the box member A has its hinge arms 29 pivotally connected to its supports 27 by hinge pins mounted in the lower set of pin holes 27b, 29b. By such an arrangement it is possible to vertically offset the two bed units in collapsed position by a vertical distance equal to twice the distance between the pivot pin holes 27a and 27b. This vertical spacing of the bed units when they are in collapsed position provides sufficient space for the storing of one of the mattress units between the bed units as is clearly shown in Fig. 14. To positively lock the bed units in unfolded condition locking pins 26 are inserted in the aligned sets of pin holes that are not being used as pivot pin journals. This braces the beds in their extended position and provides a rigid bed supporting arrangement.

The outboard end of each end rail 33 of the two bed units includes substantially V-shaped slots 33a (see Figs. 5 and 6). These slots 33a are adapted to be connected to mating anchor pins 51a, carried by each of the canopy frame supporting posts 51, when the bed units are unfolded to extended position. To provide means for locking the two bed units 30, 31 together in their folded position within the container A, the end rails 33 of the bed unit 31 have bolts 36 mounted thereon so as to extend downwardly therefrom. The end rails 33 of bed unit 30 are formed with bolt receiving openings 36a which encircle the bolts 36 when the beds are folded into the container A. Wing nuts 37 are threaded on the bolts 36 to lock the two bed units together in folded condition (see Fig. 16).

The canopy supporting framework (see Figs. 2, 3, 7, 8 and 9) comprises a pair of ridge pole supports 52, a ridge pole 53, a spreader bar 54 pivotally connected to the ridge pole 53 by a pivot pin 55 and two eaves supporting frameworks each of which comprises a side rail 56 having eaves rail 57 pivotally connected to each end thereof. The side rails 56 also have pivotally connected at each end thereof the side posts 51. Fig. 7 of the drawings shows the joint 7 at each end of each side rail 56. It will be noted that the pin connection 61 between the eaves rail 57 and the joint housing 62 is such as to permit the eaves rail 57 to be folded to a position adjacent to and parallel to the rail 56. The hinge pin 63 will likewise permit the side supporting post 51 to also be folded to a position parallel to and adjacent the side rail 56. The side rail 56 is fixedly connected to the housings 62 by means of the anchor pins 64.

Each ridge pole supporting post 52 is formed at its upper end with an aperture 52a (see Fig. 8) which is adapted to be sprung over a C-shaped spring washer 68 carried by stud member 69 which is threaded into a cap member 70 fixed to each end of the ridge pole 53. The cap member 70 on each end of ridge pole 53 (see Fig. 9) is formed with a pair of radially projecting headed studs 71 which are adapted to be mounted within the hollow free ends of the adjacently positioned eaves poles 57. To provide a spring lock for retaining the eaves poles 57 connected to the studs 71 each eaves pole has a spring strap 73 fixed to the free end thereof by screws 72. The spring strap 73 carries an anchor pin 74 at the free end thereof. Anchor pin 74 is adapted to extend through an opening in the eaves pole 57 and to seat behind the shoulder-like head 71a on the associated stud 71. To connect the eaves poles to the ridge pole it is merely necessary to position the studs 71 within the hollow ends of the eaves poles 57 and press the eaves poles 57 towards the ridge pole 53. Anchor pin 74 will be cammed outwardly and will snap behind the shoulder 71a on the stud 71 and detachably lock the poles 57 and 52 together. To disconnect these assembled elements it is merely necessary to spring the strap member 73 outwardly so as to remove the anchor pin 74 from behind the shoulder 71a and then poles 57, 53 may be separated.

Each side post 51 is hollow and has mounted in the lower end thereof a pipe like leg member 76. A spring 77 is concentrically mounted and secured between the inner surface of post 51 and the outer surface of the pipe-like leg 76. Spring 77 which is fixedly connected to and concentrically mounted about leg 76 serves as a bushing to take up the clearance between the concentrically mounted post 51 and leg 76. Leg 76 is telescopically adjustable within the post 51 so that the level of the bed units 30, 31 and the side rails 56 may be adjusted on uneven ground. A tiltable locking washer 78 surrounds the leg 76 and is adapted to be cocked by engagement with the lower end of post 51 which is purposely formed with the end surface cut at an angle to the horizontal to facilitate cocking of the locking washer 78. Mounted beneath the locking washer 78 is a resilient energizing washer 79, preferably formed of rubber, which fits tightly about the leg 76 and tends to hold the locking washer 78 in any selected position. The lower ends of the legs 76 are each provided with an enlarged plate-like foot 80 to prevent the leg from sinking into soft ground. Fixed to each side post 51 is a collar 50 which carries the projecting stud 51a. The stud 51a is adapted to be engaged with the V-shaped slot 33a of the bed end rail 33 when the bed frame is swung outwardly to unfolded, erected position.

Each ridge pole supporting post 52 has a stud 52a projecting axially from its lower end. The stud 52a is adapted to be mounted in an aperture formed in the lower or bottom wall of the substantially U-shaped post supporting bracket 129 that is fixedly mounted on the box-like foundation member A at the center of the end wall 23.

In assembling the housing structure the foundation unit A in its collapsed or folded condition is placed upon the ground at the selected location and then the ridge pole supports 52 are mounted in the brackets 129 after which the ridge pole 53 is elevated and connected to the upper ends of supports 52 by forcing the apertures 52a in the upper ends of the supporting poles 52 over the C-shaped locking washer 68 carried by the studs 69 on the ends of the ridge pole 53. The ridge pole is fixed to the canopy C (see Fig. 8). Therefore the canopy is held in a partially erected position at this point. The next step in the erection of the canopy supporting frame is the unfolding of the eaves poles 57 and the side post 51 from their folded positions adjacent the side rails 56. The side posts 51 are then inserted through openings in the corners of canopy C and thereafter the free ends of the eaves rails 57 are snapped into engagement with the headed studs 71 carried by the ridge pole end caps 70. The canopy supporting framework is now in erected position. The next step in the erection of the housing structure is the unfolding of the bed units 30, 31 from within the box-like foundation member A. The bed units 30, 31 are disconnected by removing the nuts 37 from the bolts 36 and then the uppermost bed 30 is swung outwardly through an arc of 180 degrees to its erected horizontal position. As the bed reaches the end of the opening movement the V-shaped slots 33a in its end rails 33 cam into engagement with the supporting studs 51a carried by the canopy frame side posts 51 and this locks the bed in an erected, horizontal position. The bed units are preferably provided with rope or strap elements 48 which are anchored to the bed side rails 32, 34 and extend transversely across the beds (see Figs. 1 and 2). These straps 48 provide means to facilitate lowering of the beds into their extended positions. These straps or ropes 48 also serve as tie means to anchor the bed clothing and the resilient mattresses to the bed frames when the beds are being swung to their collapsed positions. After erecting the bed 30 the bed 31 is next swung outwardly to an erected position and the housing unit is ready for occupancy. After the beds have both been opened to their erected positions and the various side post legs 76 adjusted to provide level substantially horizontal sleeping surfaces, the spreader bar 54 is swung to a position transversely of the ridge pole 53 to bulge the roof portion of the canopy C upwardly in the manner shown in Fig. 1. By positioning the spreader bar transversely of the ridge pole the head room within the central portion of the housing structure is materially increased.

It is thought to be apparent that the tent-like canopy C encloses the complete bed framework during erection of the bed units. This permits the unit to be erected in foul weather without danger of injuring the bedding or other supplies stored within the unit A. Canopy C is connected to the upper edges of the walls of the box-like foundation member A by means of resilient rods 92 which wedgingly anchor the free edges of the canopy in the substantially C-shaped channels 21b and 23b which extend about the upper edges of the side and end walls of the box-like structure A.

The tent like canopy C is a unitary element having windows 45 at one end thereof and door flaps 46 at the opposite end thereof. The windows 45 are preferably of some translucent or transparent plastic material that is tough and flexible so as not to be injured when the canopy is collapsed and packed in the box-like container A. Door flaps 46 may be lowered and fastened in a closed position by means of zippers, snap fasteners or the like which elements are associated with the contiguous portions of the canopy door opening and the door flaps in a well-known manner.

It will be noted that the head end of each bed unit is formed with a transversely extending substantially rigid plate or panel 39. These panels 39 each provide a shelf on which to set out food and similar material when the beds are in extended position. These shelves 39 may be in the form of hollow containers which can be used to store food or the like. Within and extending across the closed end of the housing structure is a knockdown work table 88. Table 88 is of convenient size for storage within the box-like container A when the housing structure is in collapsed position. The work table 88 has legs that are adapted to be detachably connected to sockets (not shown) carried by the bed frames so that the table becomes a rigid part of the erected housing structure. A table 89 such as a foldable card table or the like is indicated in broken lines in Fig. 1. This table may be used for eating within the housing structure.

Figure 11:
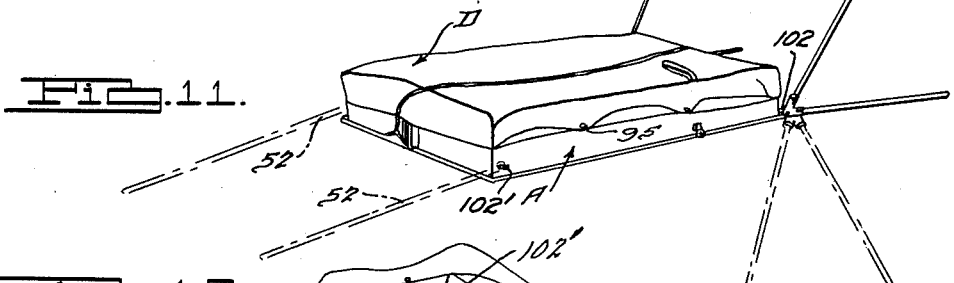
Fig. 11 is a perspective view of the housing structure in collapsed condition with a pair of elevating frames attached to each end of the box-like foundation structure.

On collapsing the house structure the table 88 is first removed, the bedding is then lashed into position, all loose articles within the structure are assembled outside of the structure and the spreader bar is turned to a position parallel to the ridge pole. The beds are then swung successively to their respective collapsed positions within the box-like container A and are bolted together by the nuts and bolts 36, 37. Thereafter the eaves poles 57 are disconnected from the ridge pole studs 71 and the side posts 51 and the eaves rails 57 are folded along the side rails 56. The ridge pole 53 is then disconnected from the supporting posts 52 and thereafter the supporting posts 52 are disconnected from the supporting cleats 129. The canopy is then folded into the container A and thereafter the various canopy supporting poles and rails as well as any other miscellaneous items such as the work table 88, folding furniture, food stores, miscellaneous bedding and clothing may be placed within the container A. A container covering D is then placed on the container A and detachably fastened to the walls thereof by suitable fasteners 95 (see Figs. 11-13).

Figure 12:
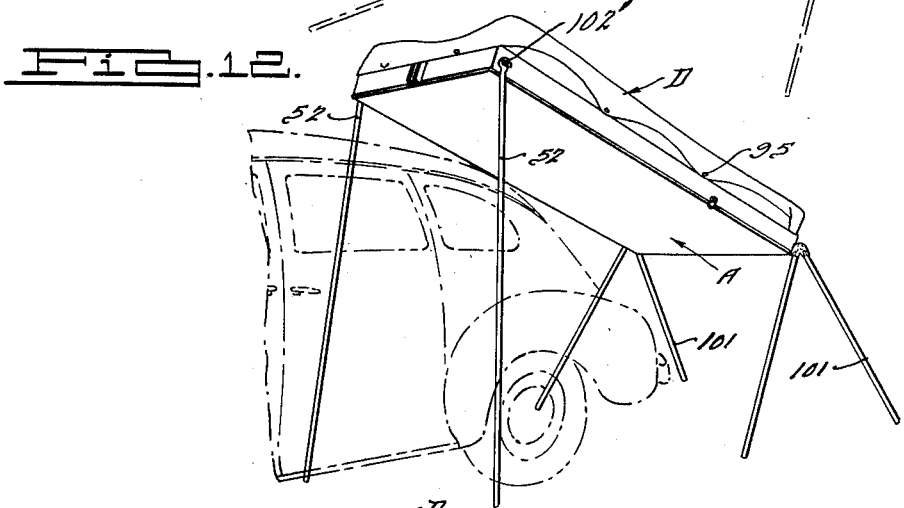
Fig. 12 is a perspective view of the collapsed housing structure elevated on both sets of elevating frames and the elevating frames positioned beneath the box-like foundation member in a manner to support it above its carrier.
Figure 13:
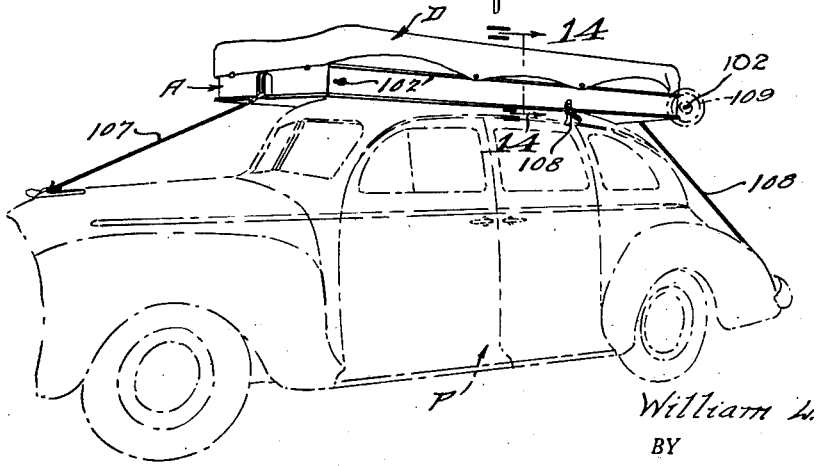
Fig. 13 is a perspective view of the collapsed housing structure mounted on a vehicle top.

The collapsed housing structure having been reduced to box-like size is then ready for mounting on the roof of the transporting vehicle. The first step in mounting the collapsed housing unit on the vehicle top is to connect the V-shaped elevating frames 101 to the axle members 102 (see Fig. 15) which members are carried by the end walls of the container A. After mounting the elevating frames 101 to the end wall at one end of the container A the ridge pole supporting posts 52 are then detachably connected to the axle members 102' that are carried by the side walls 21 at the opposite end of the container A. The next step is to lift the end of the container having the V-shaped elevating frames 101 to a raised position where the frames 101 may swing beneath the container A and support it in an elevated position. Next the opposite end of the container A is raised to a position where the ridge pole supports 52 will support the associated end of the container A in an elevated position. The completely elevated position of the container A is shown in Fig. 12. With the container A supported by the elevating frames 101 and the poles 52, the transporting vehicle P may be backed beneath the container A so that the lower wall of the box-like member A is located above a portion of the vehicle top and then the elevating frames may be removed and the foundation member A lowered into position on the top of the transporting motor vehicle. Suitable side and end anchor straps 107, 108 may be connected between the container A and the vehicle body to absorb brake reaction and positively anchor the container to the vehicle P.

From a consideration of Fig. 14 it will be obvious that the flexible sheet-like bottom 24 of the box-like foundation member A permits the resilient mattress 35 of bed unit 31 to rest upon and conform to the contour of the vehicle top. The mattress 35 of bed units 30, 31 may be of foam rubber, sisal, kapok or spring units covered with any of these materials or any other well-known, lightweight mattress filler material. This arrangement spreads out the load of the box-like container A over substantially the entire vehicle top and materially reduces the unit pressures on the various sections of the vehicle top. Furthermore, as the end frames 33 of the bed unit 30 are bolted to the end frames of bed unit 31 by the bolts and nuts 36, 37 the resilient mattress 35 of bed unit 31 assists the resilient mattress unit 35 of bed unit 30 in resiliently supporting the load of the box-like member A on the top of the motor vehicle. The resiliently suspended bed fabric strips 38 that support the resilient mattresses on the bed frames permit the mattresses to freely conform to the contour of the vehicle top. After the box-like member A has been mounted into position on the top of the motor vehicle it is still possible to load the container A with material for the covering D for the box-like container A is detachably connected to the side and end walls of the container A. Thus it is possible to mount the container unit A on the vehicle top in partially filled condition and to thereafter complete the loading. This reduces the weight of the load that has to be lifted to swing the elevating frames into position. The elevating frames are placed in the container A after the unit A is fixed to the vehicle top.

To facilitate movement of the box-like container A along the ground after the unit A has been removed from its transporting motor vehicle, wheels 109 (see Fig. 13) may be provided which may be snapped on to the axles 102 at one end of the container A and the container A may be then handled in wheelbarrow fashion to roll it to the selected camping spot. Axles 102 (see Fig. 15) are slidably mounted on the end walls by means of pairs of spaced apart eyebolts 104 fixed to the end walls. Mounted on the axles between the eyebolts is a rubber anti-rattle washer 105. Axles 102 may be extended or retracted as shown in broken lines.

The V-shaped elevating frames 101 are of knockdown construction and may be used to provide a portion of the supporting framework for a porch-like winter-front for the doorway opening to the house. The container cover D is used as the roof for this winter-front addition to the house. The winter-front extension does not form a part of the invention herein disclosed and claimed therefore it is not shown associated with the house even though the detachable fasteners 99 for connecting the winter-front extension to the house canopy C are shown in Fig. 1.

From the foregoing description of this invention it is thought to be obvious that the housing structure is one that is extremely compact when collapsed yet one that provides a maximum living space when assembled. Furthermore, the design is such that the housing structure may be easily and readily erected or collapsed and transported by means of a conventional motor vehicle without requiring the use of a special trailer, carrying frame or the like. In addition the bed units associated with the housing structure are arranged such that they accomplish a plurality of functions, namely providing sleeping areas, anchoring the canopy supporting framework in erected position, supporting the work shelf and providing a resilient supporting structure whereby the housing structure may be mounted directly on the body of the transporting vehicle.

I claim:

1. A portable housing structure comprising a box-like container having rigid side and end walls and a bottom formed of flexible material secured to said side and end walls, said side walls each having a bed unit hingedly connected thereto which units are arranged to be folded into said container in overlapping relationship with one of said bed units engageable in face-to-face contact with the bottom of the container and to be unfolded from said container so as to provide horizontally extending, spaced apart, sleeping areas, and a canopy supporting framework detachably connected to said container comprising a pair of ridge pole supporting posts detachably connected to the container end walls, a ridge pole mounted between said supporting posts, eaves rails extending from each side of said ridge pole at each end thereof, side rails connecting the eaves rails at each side of the housing structure, and side posts depending from each end of each side rail having support means mounted thereon intermediate the ends thereof engageable with a portion of a bed unit when the bed unit is unfolded from said container providing means to maintain the bed unit in a substantially horizontally extending position.

2. A portable housing structure comprising a box-like container having rigid side and end walls and a bottom formed of flexible material secured to said side and end walls, said side walls each having a bed unit hingedly connected thereto which units are arranged to be folded into said container in overlapping relationship with one of said bed units engageable throughout its area with the bottom of the container and unfolded from said container so as to provide horizontally extending, spaced apart, sleeping areas, a canopy connected to the periphery of said container and a framework supporting said canopy detachably connected to said container comprising a pair of ridge pole supporting posts detachably connected to the container end walls, a ridge pole mounted between said supporting posts, eaves rails extending from each side of said ridge pole at each end thereof, side rails connecting the eaves rails at each side of the housing structure, side posts depending from each end of each side rail, and means carried by said side posts detachably connected to said bed units to support the outboard side of said bed units in unfolded positions.

3. A portable housing structure comprising a box-like container having rigid side and end walls and a bottom formed of flexible material secured to said side and end walls, said side walls each having a bed unit hingedly connected thereto which units are arranged to be folded into said container in overlapping relationship with one of said bed units engageable with the bottom wall of the container and unfolded from said container so as to provide horizontally extending, spaced apart, sleeping areas, a canopy connected to the periphery of said container and a framework supporting said canopy detachably connected to said container comprising a pair of ridge pole supporting posts detachably connected to the container end walls, a ridge pole mounted between said supporting posts, eaves rails extending from each side of said ridge pole at each end thereof, side rails connecting the eaves rails at each side of the housing structure, side posts depending from each end of each side rail, and means carried by said side posts detachably connected to said bed units to support the outboard side of said bed units in unfolded positions, said side posts each including a telescopically arranged leg to facilitate leveling of said bed units and said side rails when the structure is in erected position.

4. A portable housing structure comprising a box-like container having side, end and bottom walls, a bed unit hingedly mounted on each side wall, said units being arranged to be positioned within said container in overlapping, collapsed, relationship and to be swung outwardly from said container to a substantially horizontal, erected position adjacent the outer side of each side wall, post supporting brackets carried by each end wall each adapted to support a post in a vertical position and a knock-down canopy supporting frame detachably connected to said container comprising a pair of ridge pole supporting posts mounted in said brackets, a ridge pole connected between said supporting posts, and a pair of side rail assemblies connected to said ridge pole, each assembly comprising a side rail having pivotally mounted at each end an eaves rail and a side post, said side posts each including means supporting a portion of a bed unit in its erected position.

5. A portable housing structure comprising a box-like container having a pair of bed units pivotally mounted on opposed side walls thereof for movement between horizontally disposed positions within and without said container, a canopy extending about and connected to the side and end walls of said container, and a canopy supporting frame comprising a pair of ridge pole supporting posts detachably connected to the end walls of said container, a ridge pole detachably connected to said supporting posts, eaves rails detachably connected to each end of the ridge pole at each side thereof, a side rail extending between and pivotally connected to the eaves rails on each side of the ridge pole, a side post pivotally connected to each end of each side rail and means to support the bed units in a horizontal position without the container.

6. A portable housing structure comprising a box-like container having a pair of bed units pivotally mounted on opposed side walls thereof for horizontal positioning within and without said container, a canopy extending about and connected to the side and end walls of said container, and a canopy supporting frame comprising a pair of ridge pole supporting posts detachably connected to the end walls of said container, a ridge pole detachably connected to said supporting posts, a spreader bar pivotally mounted on said ridge pole adapted to be selectively positioned parallel to and transversely of said ridge pole, eaves rails detachably connected to each end of the ridge pole at each side thereof, a side rail extending between and pivotally connected to the eaves rails on each side of the ridge pole, a side post pivotally connected to each end of each side rail, and means on said side posts engaged with said bed units supporting said bed units in erected positions.

7. A portable housing structure comprising a box-like container having a pair of bed units pivotally mounted on opposed side walls thereof, a canopy extending about and connected to the side and end walls of said container, and a canopy supporting frame comprising a pair of ridge pole supporting posts detachably connected to the end walls of said container, a ridge pole detachably connected to said supporting posts, eaves rails detachably connected to each end of the ridge pole at each side thereof, a side rail extending between and pivotally connected to the eaves rails on each side of the ridge pole, and a side post pivotally connected to each end of each side rail, said side posts each including an extensible leg and means detachably connected to a bed unit to provide a support therefore.

8. A portable, collapsible, housing structure comprising a box-like container having rigid side and end walls and a flexible bottom wall, a flexible canopy connected to the periphery of said container adapted to provide collapsible side, end and top walls of the housing structure when the housing structure is in erected position, a knock-down canopy supporting framework connected to the canopy and the container, a bed unit movably mounted on said container for movement from a position within said container in face-to-face engagement with said bottom wall to a position outside said container substantially parallel to said container bottom wall and means to support said bed unit in said position outside said container.

9. A portable, collapsible, housing structure adapted to be transported on the roof of a motor vehicle or the like comprising a box-like container having rigid side and end walls and a flexible bottom, a flexible canopy connected to said container adapted to provide collapsible side, end and top walls of the housing structure when the housing structure is in erected position, a knock-down canopy supporting framework connected to the canopy and to the container, and a pair of bed units hingedly mounted on the opposite side walls of the container in a manner permitting folding of the bed units into the container in overlapping, engaged, relationship with one of the bed units engaging the flexible bottom wall of the container in face-to-face relationship, the hinged mounting of the bed units permitting unfolding of the bed units from the container to spaced apart substantially horizontal positions, said framework providing leg means detachably engageable with the bed units to support the bed units in unfolded positions.

10. A portable, collapsible, housing structure adapted to be transported on the roof of a motor vehicle or the like comprising a box-like container having rigid side and end walls and a flexible bottom wall, a flexible canopy connected to said container adapted to provide collapsible side, end and top walls of the housing structure when the housing structure is in erected position, a knock-down canopy supporting framework connected to the canopy and the container side and end walls, a pair of bed units hingedly mounted on a pair of opposed container walls in a manner permitting folding of the bed units into the container in overlapping engaged relationship and unfolding of the bed units from the container to laterally spaced apart, substantially horizontal positions, and bed support elements on said framework engageable with said bed units to support the bed units when the bed units are unfolded from the container, said bed units each including means providing a resilient mattress supporting surface and a mattress element mounted thereon, one of said mattress elements being positioned on its supporting surface so as to be folded into face-to-face engagement with the flexible bottom wall of the container element when the housing structure is in collapsed condition.

11. A portable, collapsible housing structure comprising a box-like container having rigid side and end walls and a flexible bottom wall, a flexible canopy connected to said container adapted to provide the side, end and top walls of the housing structure when the housing structure is in erected position, a knock-down canopy supporting framework connected to the canopy and the container, a pair of bed units hingedly mounted on the opposite side walls of the container in a manner permitting folding of the bed units into the container in overlapping, engaged, relationship and unfolding of the bed units from the container to laterally spaced apart, substantially horizontal positions, said framework providing detachable leg means to support the bed units in unfolded positions, said bed units each including a mattress supporting surface and a resilient mattress element mounted thereon, one of said mattress elements being arranged to be folded into face-to-face engagement with the flexible bottom wall of the container element when the housing structure is in collapsed condition, and means to detachably connect the pair of bed units together when they are in folded, overlapping, relationship whereby the load of the bed units is applied to substantially the full area of the flexible bottom of the container.

12. A portable, collapsible housing structure comprising a box-like container having rigid side and end walls and a flexible bottom wall, a flexible canopy connected to said container adapted to provide the side, end and top walls of the housing structure when the housing structure is in erected position, a knock-down canopy supporting framework connected to the canopy and the container, and a pair of bed units hingedly mounted on the opposite side walls of the container in a manner permitting folding of the bed units into the container in overlapping relationship and unfolding of the bed units from the container to transversely spaced apart, substantially horizontal positions detachably engaged with said framework, said bed units each including opposed pairs of connected, rigid, side and end rails having resiliently supported therebetween a mattress supporting fabric and a mattress mounted thereon, said hingedly mounted bed units being arranged such that one of said mattresses is foldable into face-to-face engagement with the flexible bottom wall of the container when the beds are folded into said container.

WILLIAM L. SHEPPARD.

References Cited in the file of this patent

UNITED STATES PATENTS

| Number | Name | Date |
|---|---|---|
| 1,030,320 | Morgan | June 25, 1912 |
| 1,148,802 | Roswall | Aug. 3, 1915 |
| 1,329,956 | Calatynd | Feb. 3, 1920 |
| 1,336,627 | Hannam | Apr. 13, 1920 |
| 1,571,426 | Mitchell | Feb. 2, 1926 |
| 1,693,012 | Wright | Nov. 27, 1928 |
| 1,751,290 | Race | Mar. 18, 1930 |
| 1,774,017 | King | Aug. 26, 1930 |
| 1,958,169 | O'Neill | May 8, 1934 |
| 1,984,631 | Jackson | Dec. 18, 1934 |
| 2,371,481 | Terrell | Mar. 13, 1945 |
| 2,481,230 | MacDonald | Sept. 6, 1949 |